(12) United States Patent
Costa

(10) Patent No.: US 7,846,328 B2
(45) Date of Patent: Dec. 7, 2010

(54) TREATMENT SYSTEM FOR ENHANCED WATER AND WASTEWATER NUTRIENT REMOVAL

(76) Inventor: Matthew C. Costa, P.O. Box 128 465 E. Falmouth Hwy., East Falmouth, MA (US) 02635

(*) Notice: Subject to any disclaimer, the term of this patent is extended or adjusted under 35 U.S.C. 154(b) by 463 days.

(21) Appl. No.: 11/782,176

(22) Filed: Jul. 24, 2007

(65) Prior Publication Data
US 2009/0026132 A1 Jan. 29, 2009

(51) Int. Cl.
*C02F 3/00* (2006.01)
(52) U.S. Cl. .............. 210/194; 210/195.1; 210/195.3; 210/196; 210/197; 210/265; 210/532.2
(58) Field of Classification Search ............ 210/532.2, 210/194–197, 265
See application file for complete search history.

(56) References Cited

U.S. PATENT DOCUMENTS

| | | | |
|---|---|---|---|
| 6,531,062 B1* | 3/2003 | Whitehill | 210/602 |
| 6,540,910 B2* | 4/2003 | Schwarzenegger et al. | 210/151 |
| 2003/0222033 A1* | 12/2003 | Carroll et al. | 210/805 |

* cited by examiner

Primary Examiner—Chester T Barry

(57) ABSTRACT

Disclosed is a wastewater treatment apparatus utilizing time tested techniques for recirculating media treatment with proprietary advancements to produce a system capable of nitrifying and denitrifying wastewater through the use of passive calcium carbonate and organic carbon feed systems. By creating aerobic and anaerobic zones and the ability to monitor and adjust these zones by physical and mechanical means with minimal operator involvement, wastewater is recycled through these zones thereby creating an enhanced biological filtering process. The treated wastewater is then discharged to standard leaching facilities, various irrigation uses and/or introduced to further treatment for water recycling and reuse.

6 Claims, 8 Drawing Sheets

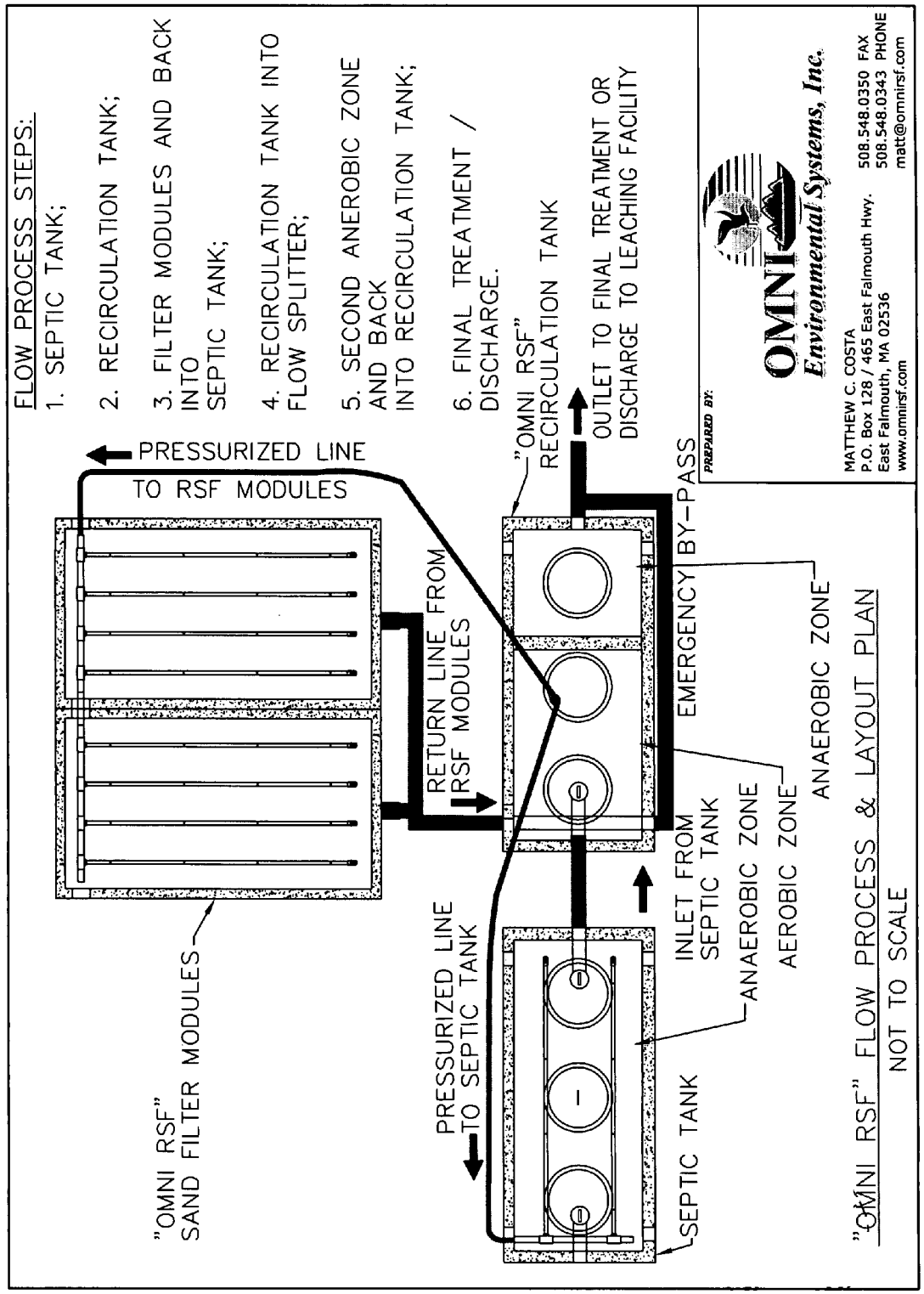

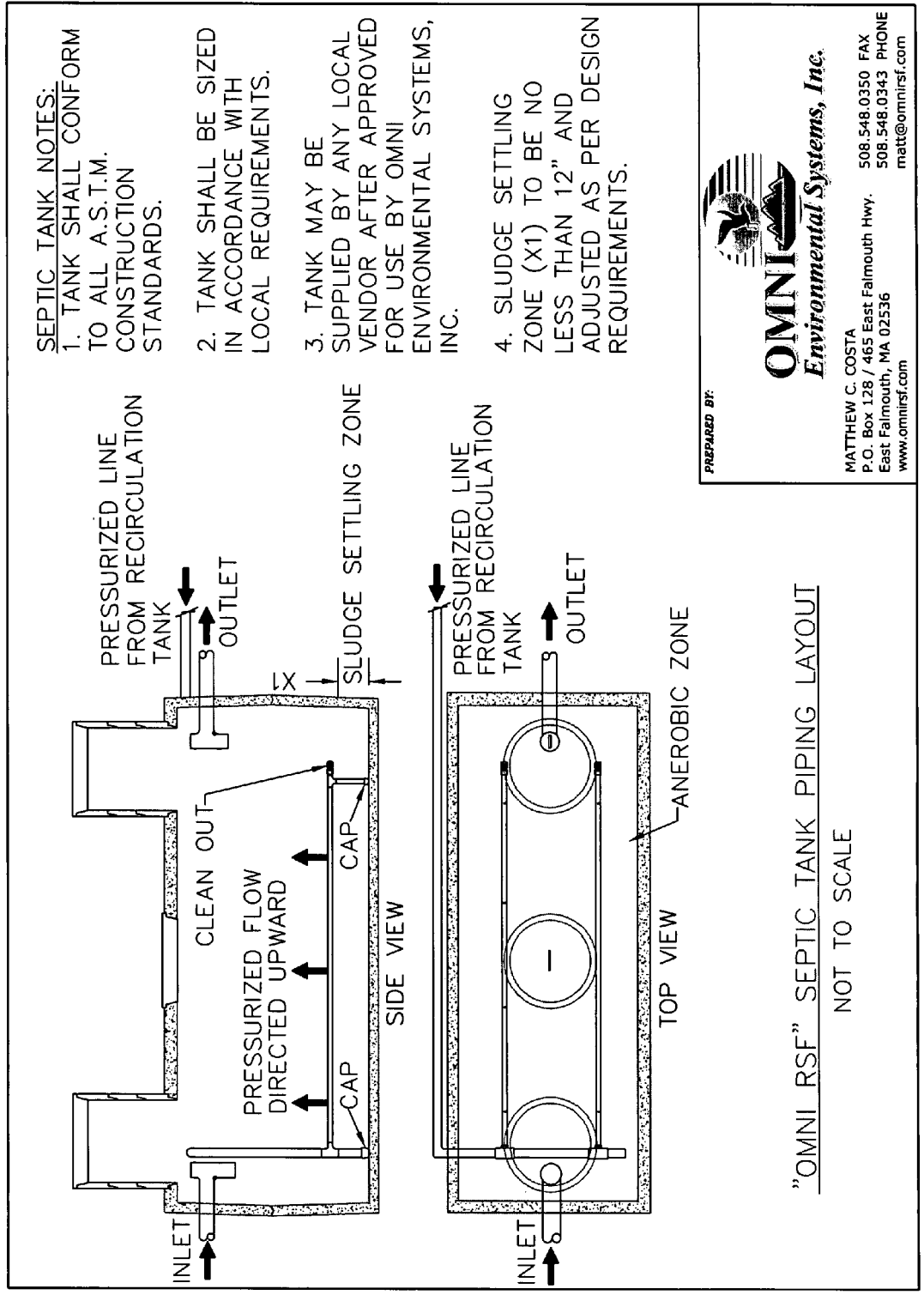

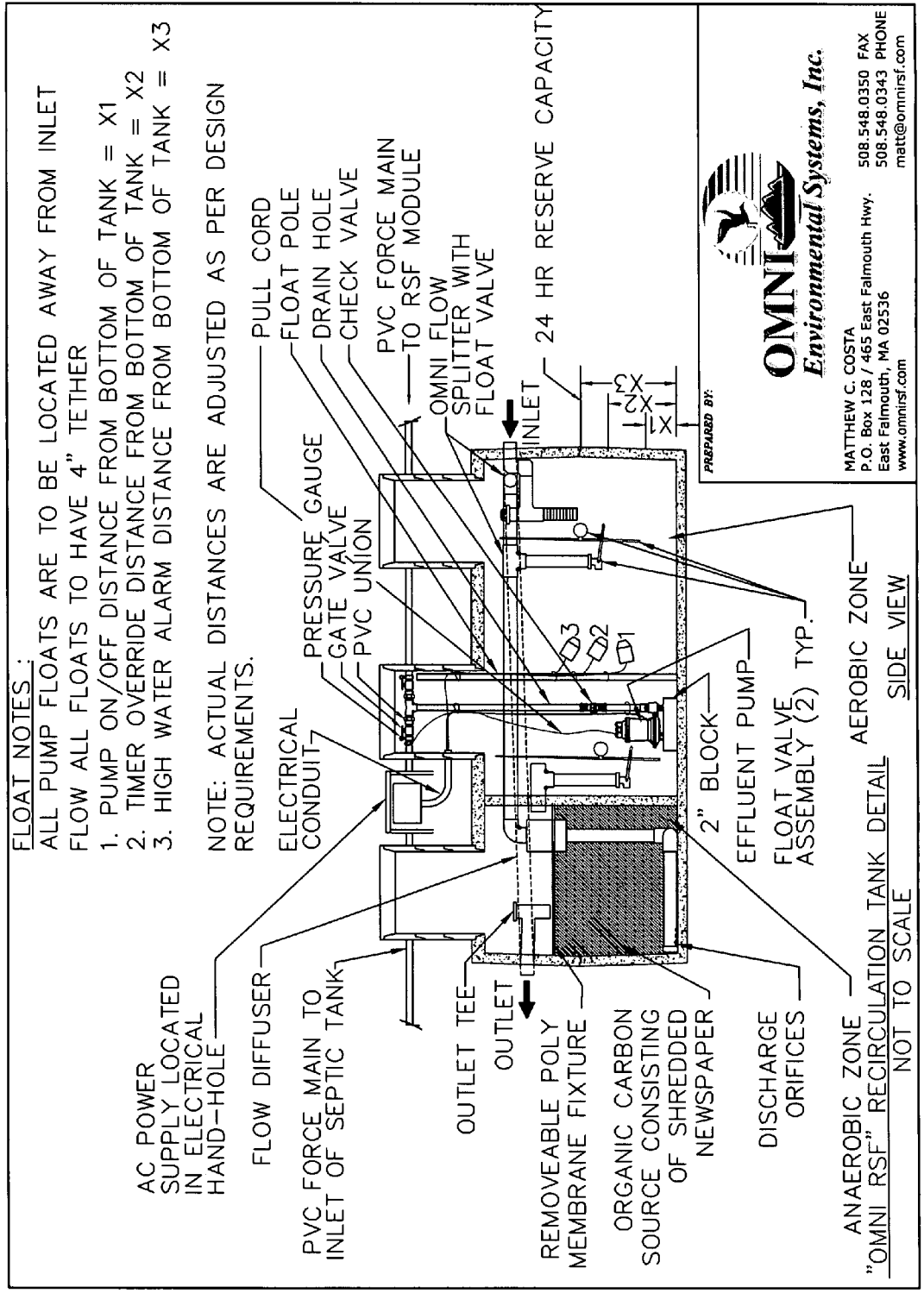

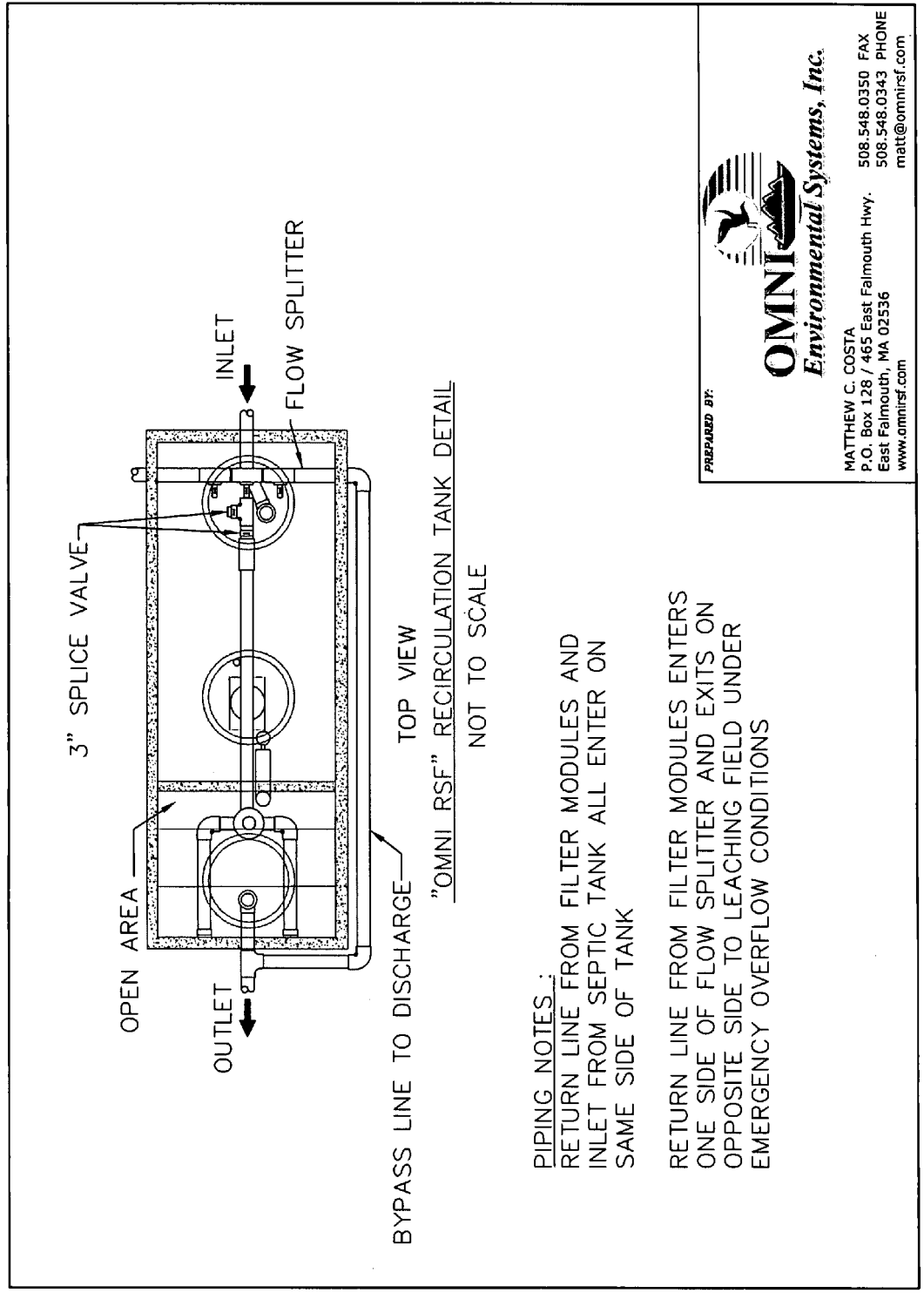

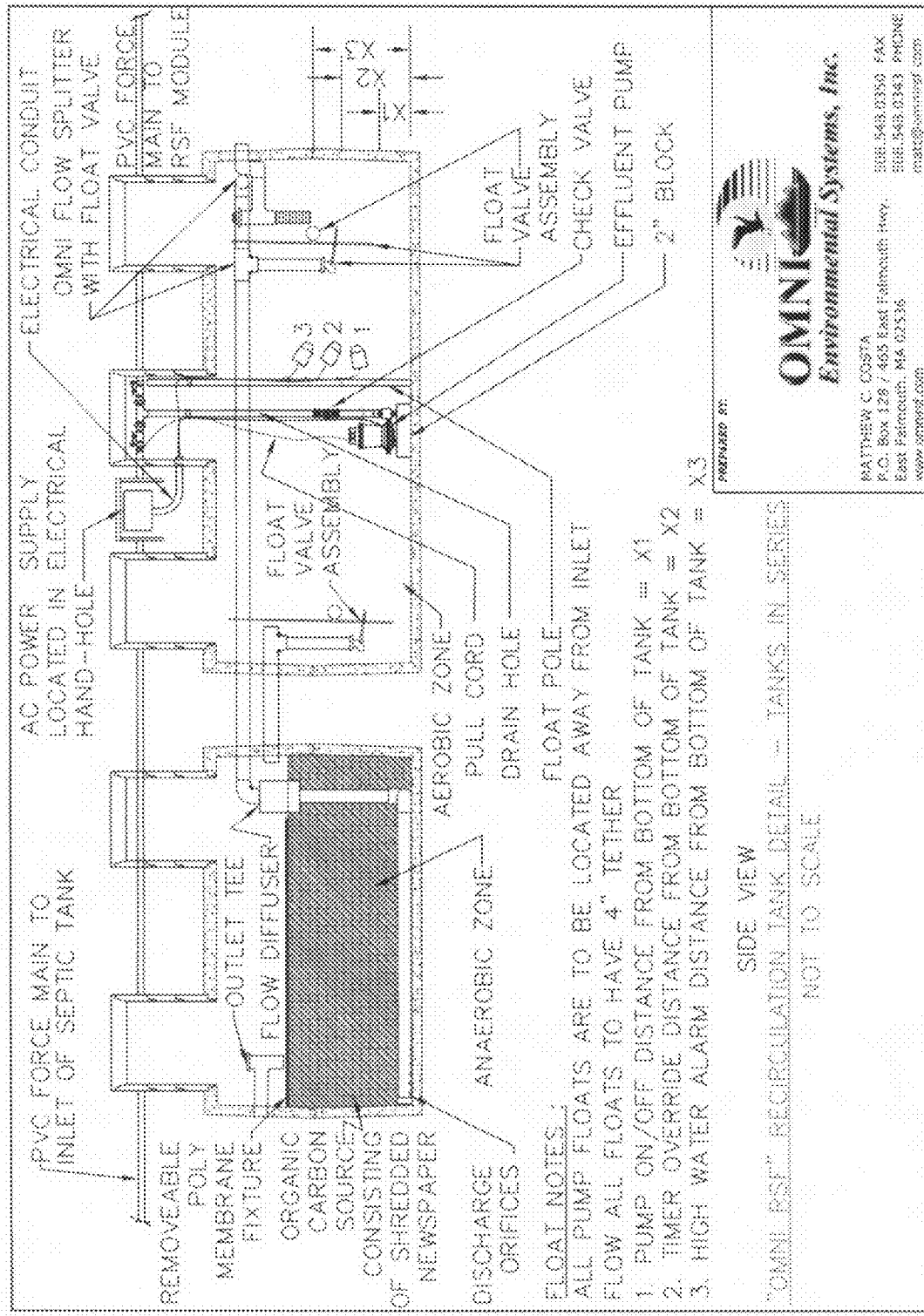

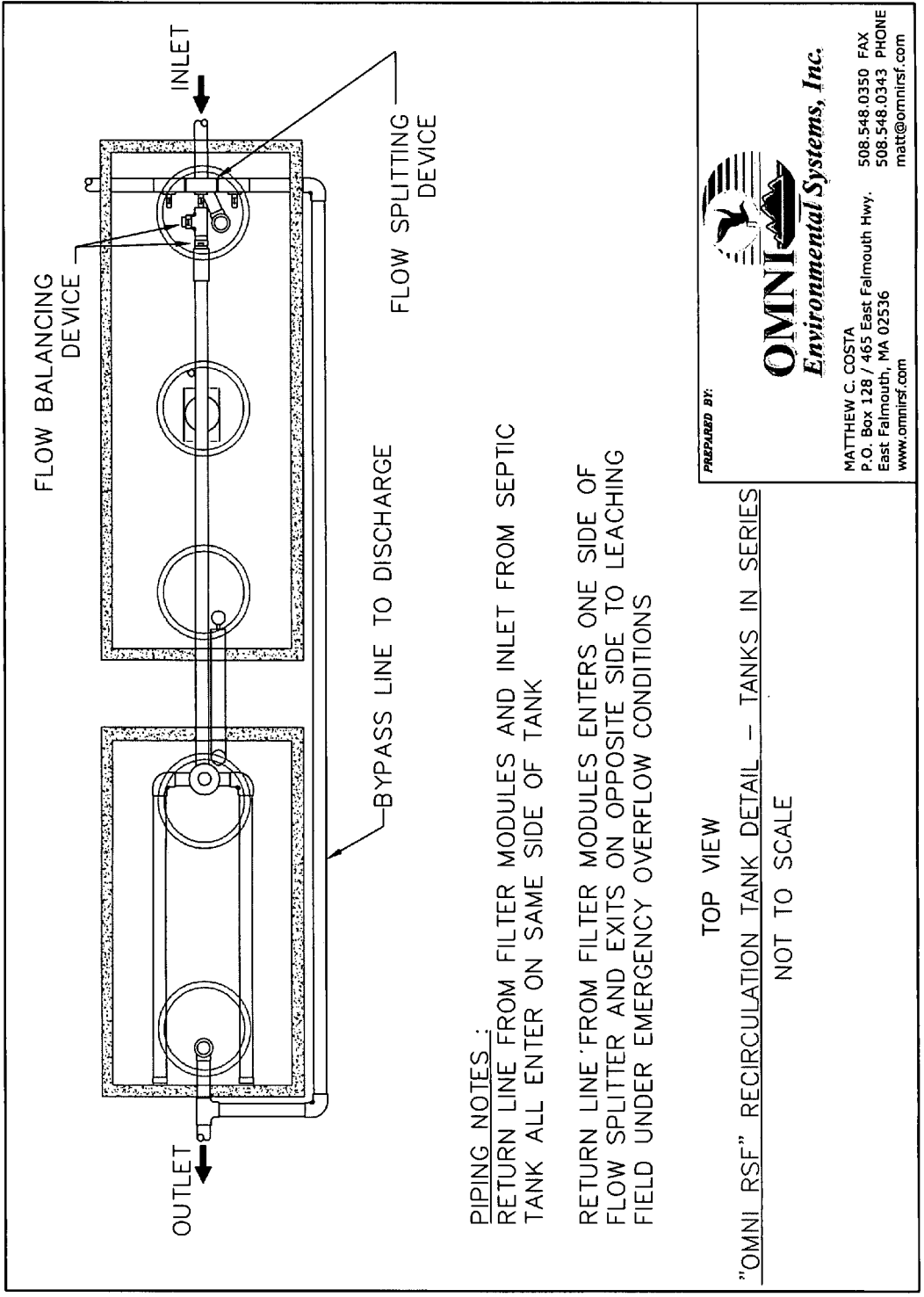

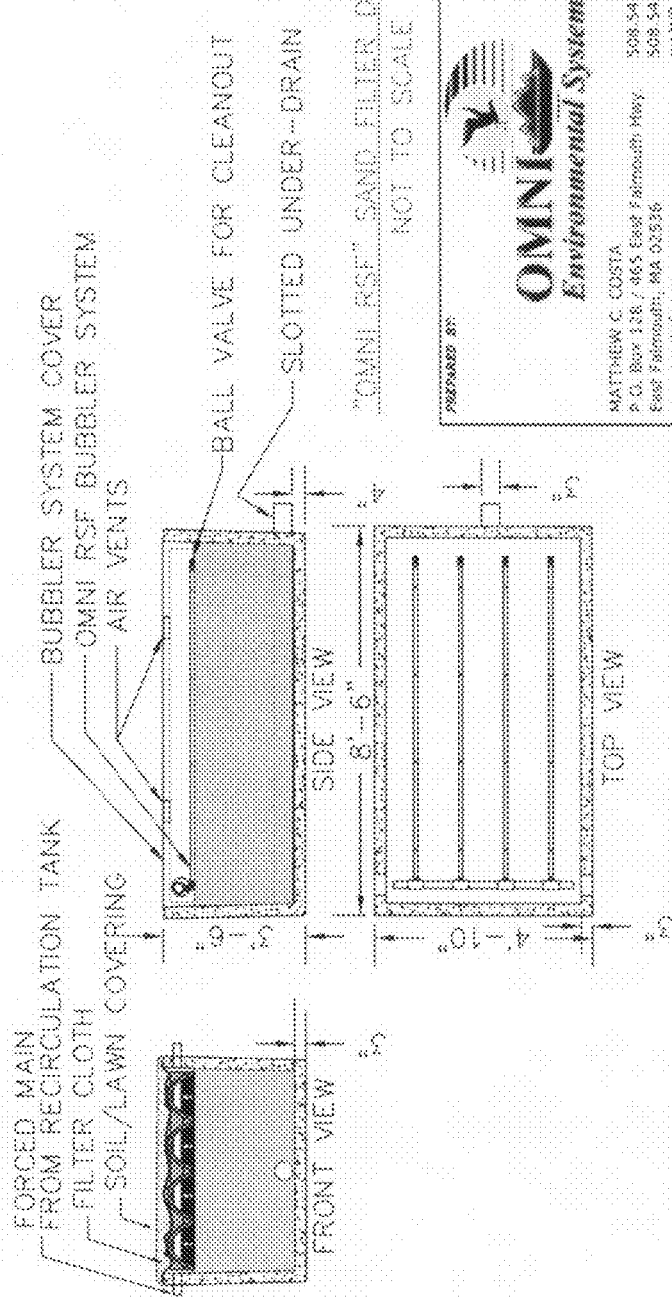

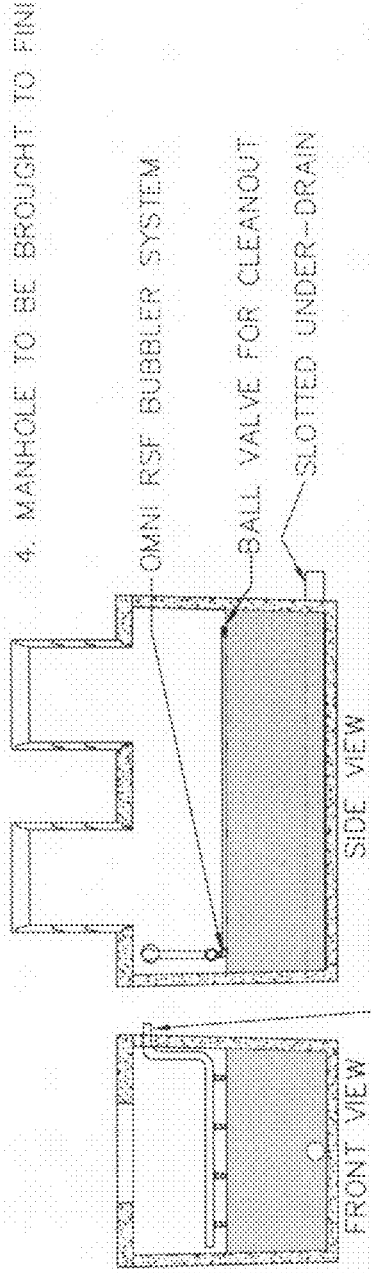

TREATMENT SYSTEM FOR ENHANCED WATER AND WASTEWATER NUTRIENT REMOVAL

BACKGROUND OF THE INVENTION

With the ever-increasing number of contaminated rivers, ponds, estuaries and diminishing number of natural potable water supplies, we are quickly realizing the cumulative impact wastewater has on our natural resources. The degradation of water quality from wastewater discharge is a global issue that is intertwined with population growth. The eutrophication of our coastal systems has become an environmental crisis quickly gaining the attention of the public. There has been an increase in harmful algal blooms "Red Tide", which decimate local shell fish beds and result in fish kills. There has also been an increase in what are known as "dead zones" in where the nutrients released from untreated and/or partially-treated wastewater supports a radical growth of the algae resulting in depleted oxygen levels in the waters and a devastating imbalance in coastal ecosystems. The most recent data reported by the United Nations have identified 150 sites classified as "Dead Zones". It has become apparent the measures taken to protect our natural resources today, will determine the quality of life for future generations.

Conventional wastewater nitrogen removal techniques are incapable of providing a cost effective solution, or fail to remove a significant amount of total nitrogen within a single system. Most existing systems try to accomplish nitrogen removal in a single pass application.

In the wastewater industry it has become common knowledge that through biological treatment the ammonium ions found in wastewater can be converted to nitrite and nitrate ions by organisms living in aerobic zones where, subsequently, the nitrate can be introduced into a second zone where they can be then converted into harmless nitrogen gas by organisms found in the anaerobic zones. For the nitrification process to occur, a sufficient level of alkalinity is required within the aerobic zones. Without sufficient levels of alkalinity the complete conversion from ammonium ions to nitrate can not take place, thereby preventing the subsequent conversion of the nitrate to nitrogen gas to occur, resulting in the release of ammonium ions into groundwater sources and ultimately coastal waters where they are eventually converted to nitrate and contribute to nitrogen pollution and nutrient overloading of coastal embayments.

The second phase for biological nitrogen removal, denitrification, occurs when nitrate ions are converted to nitrogen gas within anaerobic conditions and similarly requires an organic carbon source in sufficient quantities. Additionally, without a sufficient amount of organic carbon available, the reaction can not reach completion, again, resulting in the release of nitrates into the groundwater and ultimately coastal waters.

PRIOR ART

The biological treatment of wastewater is a well documented and defined science where there are several biological processes necessary to complete the removal of nitrogen. The first process, nitrification, is the oxidation of ammonia where the byproducts are nitrite and nitrate. In this process the growth and reproduction of the biological population is strongly influenced by several factors including, alkalinity, pH, and temperature.

Prior technologies focused on nitrification without passive alkalinity sources and do not incorporate passive carbon feed sources within the same wastewater treatment package. Prior technologies have utilized manual alkalinity and carbon feed systems resulting in high costs devices that require extensive maintenance and monitoring to insure proper performance. Traditionally, ethanol, woodchips and other proprietary organic carbon sources have been used to enhance denitrification without combining the prerequisite nitrifying process with a recycled renewable organic carbon source contained within a single package.

Traditionally, these conditions required for nitrification and denitrification have been maintained by the mechanical addition of chemicals and have not included a "passive feed" design whereby only the required carbon and alkalinity levels are maintained in the system without mechanical means or additions and through the use of naturally renewable and recycled resources.

It has also been proposed that the effluent can be passed through an uncontained denitrification zone in a single pass application. However, this theory is only viable when operating conditions are optimal and the ammonium ions have been completely converted to nitrate ions. In a closed circuit system no net loss is recorded in the form of evaporates, and final discharge occurs only after the system has preformed the proper remediation.

In the current schematic of wastewater treatment systems there is no balance for a system that endures a dormant period. In such a case the biological colonies are left without the proper Dissolved Oxygen (DO) and/or nutrients which enable the life of the colonies, resulting in substantial performance issues. Due to the fragile nature of the nitrifying biological colonies and the extremely low reproductive rates, it is critical to maintain a steady environment for this process to consistently and effectively occur.

Moreover, typical sand filters used in wastewater treatment have used actual sand particles as the subject media where system designs required substantial surface area to prevent overloading and clogging of the filter.

BRIEF SUMMARY OF THE INVENTION

The invention provides methods, apparatuses and systems for reducing nitrogen in wastewater through a recirculation media filter process utilizing both passive calcium carbonate and carbon feed control methods.

The invention is a variable multi-pass recirculating sand filter type of technology that allows the operator to adjust the effluent mix ratio combining activated sludge treatment principles within a recirculating trickling media process for optimized system performance and nitrogen removal. Design guidelines for the invention require minimal filter surface area and retention times allowing for moderately sized components to be used thereby creating a low cost effective wastewater treatment facility. Additionally, by utilizing gravity flow processes and containing minimal pumps and moving parts the system is designed to require minimal maintenance, low operating costs and long reliable performance records.

The passive feed system use a seashell and stone media mixture, and mixtures thereof, as a calcium carbonate source to raise alkalinity levels whereby high loading rates may be applied to the filter media while sustaining sufficient nitrification. Alkalinity is lost during the nitrification process. The nitrifying bacteria utilize alkalinity as a carbon source therefore reducing the alkalinity of the system. Moreover, recycled newspaper, recycled paper products, and any mixtures thereof, are used as an organic carbon source for the denitrification bacteria, and require low retention times for denitrification to occur allowing for smaller system components to be used than traditional methods, resulting in an extremely cost effective nitrogen removal system that utilizes both naturally occurring and recycled resources.

The invention has a unique way of controlling flow throughout the system. The piping has several control measures which include flow splitter, flow balancing, and pump throttling. Each plays a vital role in the system balance to create the optimal habitat for the bacteria.

All products and components of the system have been designed and are capable of being retrofitted or used in conjunction with or as "third-party" add-ons for wastewater, groundwater, stormwater and agricultural runoff applications and means for treatment processes for nitrification and/or denitrification of water and wastewater.

The invention is capable of sustaining the bacterial colonies required for nitrification and denitrification during dormant periods. This is achieved by continuously recycling the effluent through the system to ensure a healthy population and maintaining a predetermine level within the tanks that will not allow water to be discharged from the system until such levels are raised to a level requiring discharge. A continuous cycle is obtained by the recovery from the denitrification process in a time of low water levels where an equilibrium or "steady state operating" level is maintained within the system and no water is discharged until new wastewater enters the system.

The invention has also incorporated an aesthetically friendly venting system. Each component is connected subsurface and vented, when necessary through surface vents and/or through the covering soil. There is no obtrusive venting or blower systems located above ground and the filter module can be covered with soil or contained within a vessel(s) and located beneath structures and roadways.

The invention uses a homogeneous mixture of 3/8" native pea stone (or equal) and a calcium carbonate source in the form of seashells and/or coral where in the media is capable of handling increased loading and virtually eliminates clogging, drastically reducing maintenance requirements. Additionally, the low maintenance requirements for the media allow it to be contained below surface or in tanks for vessels with limited access

BRIEF DESCRIPTION OF THE DRAWINGS

By way of further explanation of the invention, examples are contained herein for the accompanying drawings, in which:

FIG. 1. is a diagram and flow process of the complete system which embodies the invention;

FIG. 2. is a diagram of the piping schematic of the septic tank or tanks;

FIG. 3. is a diagram of the piping schematic of the recirculation tank as a single tank, side view;

FIG. 4. is a diagram of the piping schematic of the recirculation tank as a single tank, top view;

FIG. 5. is a diagram of the piping schematic of the recirculation tank as multiple tanks, side view;

FIG. 6. is a diagram of the piping schematic of the recirculation tank as multiple tanks, top view;

FIG. 7. is a diagram of the piping schematic of the filter module and/or bed used in none vehicular traffic areas;

FIG. 8. is a diagram of the piping schematic of the filter module and/or bed used in vehicular traffic areas;

DETAILED DESCRIPTION OF THE INVENTION

The invention is a self contained apparatus consisting of several vessels or tanks which utilizes a multifaceted effluent conditioning process for biological treatment of wastewater. The process flow of effluent is show in FIG. 1 where the recycling of the treated water through alternating aerobic and anaerobic zones occurs. It has been proposed that nitrogen removal can be attained in a single pass system; however, this has been proven to be an unrealistic theory due to over loading events and variable flow situations. Moreover, these biochemical reactions are limited due to the availability of sufficient alkalinity and organic carbon within the system. This invention is capable of containing a large influx of water while allowing proper retention time in the aerobic/anaerobic zones. Additionally, the invention also integrates process controls and system adjustments for effective wastewater recovery in which highly treated and partially treated effluent is recycled through anaerobic and aerobic zones thereby allowing the biological processes sufficient time for both nitrification and denitrification to occur. This process ensures the optimal balance of the system.

The invention is based on traditional sand filter technology and basic wastewater chemistry with new and improved process designs, apparatuses, controls, media and piping employing several key conceptual changes and upgrades. First, return aerated effluent by pressure to the septic tank, know as "head of the works" is a unique piping design which allows the nitrate rich effluent to be injected to an anaerobic zone, in an upward direction, FIG. 2 creating a settling zone for suspended solids. Secondly, an anaerobic denitrification zone and/or tank, complete with a readily biodegradable carbon source (passive feed) system have been integrated into the process flow and system components FIGS. 3,4&5. Also a passive calcium carbonate feed for stabilizing alkalinity levels is housed within the filter module FIGS. 7&8 in a mixture of the media. A requirement of a successful nitrification process is a presence of alkalinity to provide the bacteria with an adequate carbon source. This prevents the system from becoming to acidic, and promotes an optimal condition for bacterial growth. A system with a low pH inhibits enzymatic activity of the nitrifying bacteria.

The invention creates two biological environments that work together to remove total nitrogen, phosphorus, biochemical oxygen demand, total suspended solids and bacteria from wastewater. The two environments include an aerobic zone located within a portion of the recirculation tank see FIG. 3 and the filter modules with alkalinity buffer, and two anaerobic zones one is located within the septic tank FIG. 2 and the second is contained inside the recirculation tank, or in a separate component FIG. 5, is baffled to contain another anaerobic zone with a carbon source.

The piping schematic of the said invention include several innovative designs that are unique designed for the purposes of flow balancing and flow splitting FIG. 3-6.

Wastewater enters the system via the septic tank where primary settling occurs and the first anaerobic zone within the system is created FIGS. 1&2. Effluent then flows by gravity into the recirculation tank, the first aerobic zone, where it is mixed with nitrified effluent that has been recycling through the filter modules FIG. 3-6. The effluent in the aerobic side of the recirculation tank is pump up to the top of the filter module(s) or filter bed were it enters a pressurized dispersal system and sprays into an open area created by a structure place atop the filter modules; the effluent makes contact with the atmospheric oxygen and percolates down through the seashell laden media where it comes into contact with aerobic bacteria living on the surface of the media FIGS. 7&8. The media is sized so as to allow the creation of voids throughout the cross-section to promote oxygen intrusion to all depths of the media and maintain sufficient oxygen to sustain the biological component being the aerobic bacteria to ensure the nitrification process.

A typical septic tank is fitted with additional pressurized piping, specifically configured where recycled effluent is pumped from the recirculation tank to the septic tank into an manifold located approximately one (1) foot above the bottom of the tank with discharge orifices directed upwards creating a settling zone below the piping, thereby recycling aerated effluent with anaerobic influent promoting the first phase of denitrification within the system flow process FIG. 2. The innovative return to "head of the works" serves dual purposes: first it provides a constant supply of nutrients to the upper layer of the tank to promote denitrification and primary settling; second it supplies two layers of sludge one active (upper/slightly aerated), and lower/anaerobic. The upper aerated layer allows aerobic settling of suspended solids and the lower anoxic layer allows for anaerobic sludge digestion.

I claim:

1. A system designed for enhanced treatment wastewater, including nitrogen removal using biological methods: the invention includes a septic tank vessel(s) comprising at least one tank or tanks in series, sized at a minimum of one hundred and fifty percent (150%) of the design flow, so arranged that the influent from the septic tank flows by gravity to the recirculation tank; a recirculation tank vessel(s) comprising at least one tank or tanks in series, of which a single tank contains an effluent pump(s), flow splitter device and two (2) float valves, where a portion of the tank contents (effluent) is then pumped back into the septic tank and the remainder of said effluent portion is pumped up to filter modules or bed and flows by gravity back into the recirculation tank; where the flow returning into the recirculation tank enters a flow splitter of which a float valve controlled by liquid levels within said tank releases a portion of the flow into the second compartment of the recirculation tank containing organic carbon source in an anaerobic environment for final treatment and discharge and/or recycling to recirculation tank by way of a second float valve located with the baffle or recirculation outlet of said tank; a filter module(s) (at least one reactive filter or filters within a series or one large on-site filter bed), comprised of a distribution device to ensure equal coverage of the media and allowed to percolate down through the stone and calcium carbonate mixture and return into the recirculation tank, by gravity; a second anaerobic zone combined in said recirculation tank, or in a separate tank in series, whereby the invention includes a quantity of solid material, including organic carbon, arranged in a tank containing a poly membrane removable device that is affixed to the sidewall as to cover ninety percent (90%) of the surface area thereby preventing the organic carbon medium from contact with atmospheric oxygen and providing a lateral flow path for the influent entering through and dispersal system located at the bottom of the aforementioned tank.

2. The system of claim 1, further comprising of one or more vessels housing the carbon source with a removable impervious poly membrane device separating the organic carbon from atmospheric oxygen thereby creating a zone containing anaerobic bacteria, and a dispersal system located at the bottom of said tank where nitrate laden influent is allowed to exit the flow splitter at a specified flow rate and enter through the dispersal system determined by a mechanical float valve controlled via the liquid levels within the tank where it then travels vertically and horizontally through the tank up through the ten percent (10%) open area of the membrane where it is then allowed to be discharged for final disposal.

3. The system of claim 1, wherein the septic tank comprising one or more vessels piping to disperse nitrogen rich effluent one foot from the bottom of the tank and releasing upwards to allow room for primary settling and the reintroduction of the partially nitrified effluent provides a small quantity of activated sludge digestion where this process of the effluent introduction serves dual purposes; first it provides a constant supply of nutrients to the upper layer of the tank to promote denitrification and primary settling; second it supplies two layers of sludge one active (upper/slightly aerated), and lower/anoxic where the upper aerated layer allows for settling of suspended solids and the lower anoxic layer allows for anaerobic sludge digestion.

4. The system of claim 1, wherein a leaching zone or discharge zone may be constructed according to applicable guidelines and/or discharge may be directed into zones of additional treatment, such as ultraviolet or ozone for water reuse applications.

5. The system of claim 1, wherein the system is a closed system capable of recirculation at any point in the system thereby ensuring proper treatment/retention time in an overloading event, and a balance of bacterial growth during dormant events by way of both mechanical and gravitational means.

6. The system of claim 2, wherein the organic carbon is comprised of recycled newspaper, recycled paper products, and any mixtures thereof shredded to a width of 2-5 cm and a nonspecific length.

* * * * *